United States Patent [19]
Lara

[11] Patent Number: 4,717,875
[45] Date of Patent: Jan. 5, 1988

[54] METHOD AND SYSTEM FOR DETERMINING CURVATURE IN FLUID TRANSMISSION PIPELINES

[75] Inventor: Pedro F. Lara, Dallas, Tex.

[73] Assignee: Atlantic Richfield Company, Los Angeles, Calif.

[21] Appl. No.: 831,228

[22] Filed: Feb. 19, 1986

[51] Int. Cl.$^4$ .................... E21B 47/02; G01C 7/06; G01B 7/28
[52] U.S. Cl. ..................... 324/220; 33/313; 73/151; 324/247
[58] Field of Search ............... 324/219–221, 324/207, 208, 346, 247; 33/302, 304, 312, 313, 322, 178 E, 178 F; 73/151; 175/45

[56] References Cited

U.S. PATENT DOCUMENTS

| | | |
|---|---|---|
| 2,834,113 | 5/1958 | En Dean et al. |
| 2,940,178 | 6/1960 | Krueger. |
| 3,460,028 | 8/1969 | Beaver et al. |
| 3,789,511 | 2/1974 | Groom et al. ............ 33/312 |
| 4,163,324 | 8/1979 | Russell et al. ............ 33/313 |
| 4,231,252 | 11/1980 | Cherkson ............ 33/313 X |
| 4,265,028 | 5/1981 | Van Steenwyk ............ 33/313 X |
| 4,361,192 | 11/1982 | Trowsdale ............ 33/302 X |
| 4,399,692 | 8/1983 | Hulsing et al. ............ 33/313 X |
| 4,524,526 | 6/1985 | Levine ............ 33/313 X |

FOREIGN PATENT DOCUMENTS 2088554  6/1982  United Kingdom.

*Primary Examiner*—Gerard R. Strecker
*Attorney, Agent, or Firm*—Michael E. Martin

[57] ABSTRACT

A change in curvature or displacement of a section of submarine or subterranean fluid transmission pipeline is measured by traversing the pipeline with a pig having an onboard instrument package, including accelerometers and a longitudinal position measuring device comprising a magnetometer for counting the girth welds or other known magnetic anomalies along the section of pipeline to be measured. The accelerometers are mounted at the central longitudinal axis of the pig which is substantially coincident with the central longitudinal axis of the section of pipeline being measured so that the roll attitude of the pig does not influence the signals generated by the accelerometers. This arrangement precludes the requirement of mounting the accelerometers on a gyroscopic stabilized platform since the absolute position of the pig in space is not required, but primarily the change in curvature or displacement of the pipeline from a predetermined course is what is desired to be known. The pig weight is minimized and supporting structure is sufficiently stiff as to provide natural modes of vibration at frequencies higher than the frequencies of signals of interest as the pig traverses the pipe.

14 Claims, 5 Drawing Figures

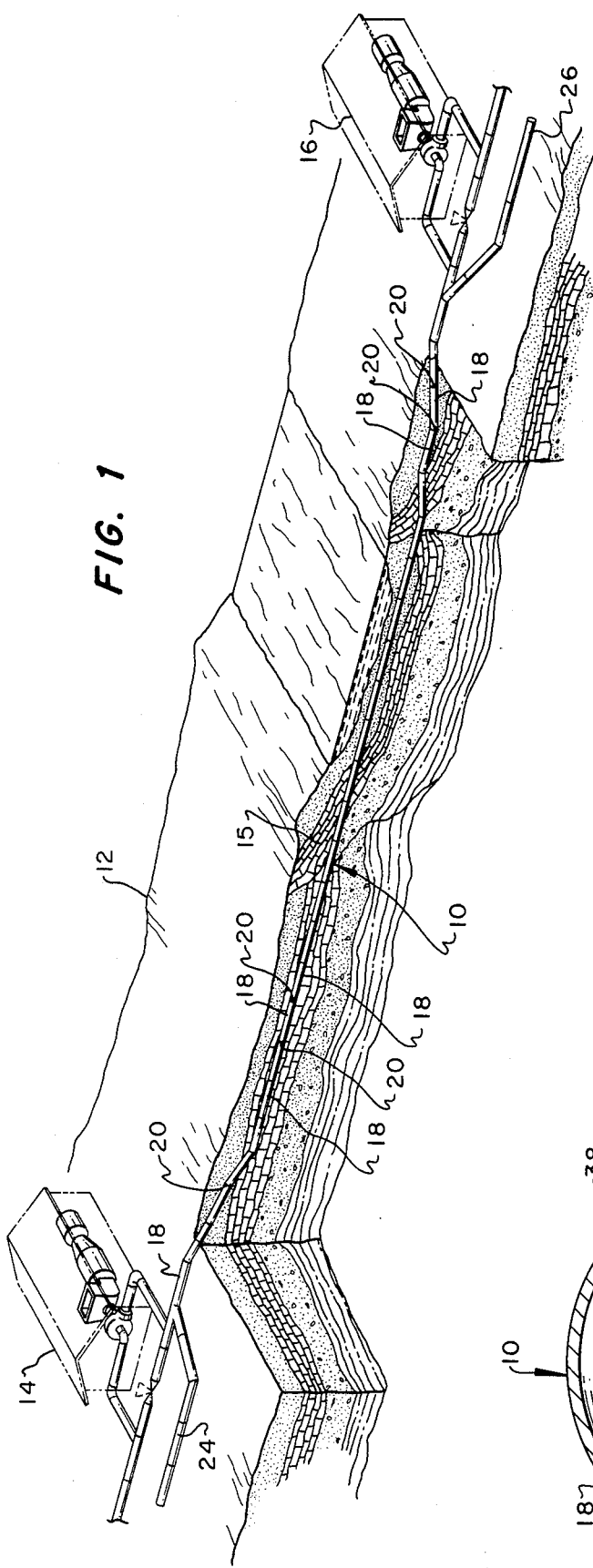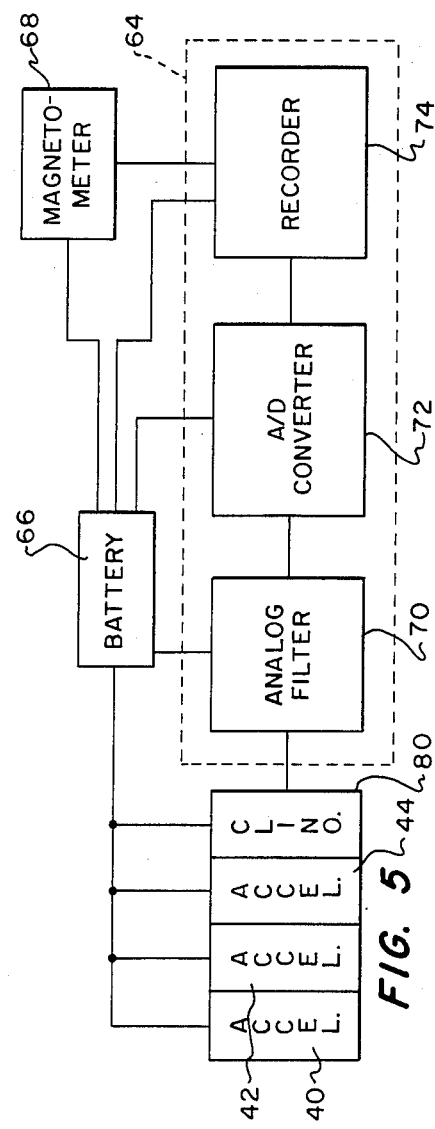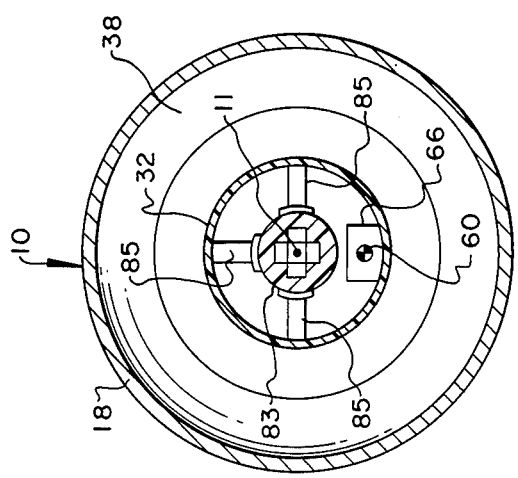

METHOD AND SYSTEM FOR DETERMINING CURVATURE IN FLUID TRANSMISSION PIPELINES

BACKGROUND OF THE INVENTION

1. Field of the Invention

The present invention pertains to a method and system for measuring curvature in fluid transmission pipelines caused by heaving or subsidence of the earth's surface wherein a pipeline pig having distance and acceleration measuring devices on board is pumped through the line to measure changes in curvature of the line at predetermined locations.

2. Background

The monitoring of fluid transmission pipelines to determine movement of certain sections of the line as a result of subsidence, frost heaving and other movement of the earth's strata is an important environmental and economic consideration with respect to pipeline operation and maintenance. Periodic monitoring of changes of curvature of fluid transmission pipelines over the length of a particular pipeline segment is particulary important for pipelines extending through environmentally sensitive areas and areas of the earth which are subject to shifting or subsidence. Pipelines located in Arctic regions, for example, are more likely to be subjected to movement of the earth's strata as a result of heaving and subsidence of the earth during cyclical freezing and thawing. Other pipelines located in areas not capable of visual inspection, such as submarine installations, are also subject to shifting due to changes in river or ocean currents, storm surges, ice movement or unwanted engagement by ship anchors or the like.

The potentially disastrous environmental and economic consequences of severe pipeline displacement cannot be tolerated. Consequently, there have been several proposals for measuring changes in pipeline location including stadia techniques, acoustic emission and fiber optic methods. One proposal includes the provision of a pipeline pig carrying onboard an aircraft or marine type fully gimballed inertial guidance system. The aforementioned types of inertial systems typically require gyroscopic stabilization and are subject to error due to the necessity of correcting or recalibrating the stabilizing gyroscopes. In many pipeline applications, the length of the line and the required time for a curvature or displacement measuring pig to make a trip through the line is such that the stabilizing gyroscopes may introduce significant errors in the readings of the guidance system which cannot be corrected to give an accurate indication of actual pipeline displacement.

Accordingly, there has been an important need to improve on existing methods of measuring pipeline displacement due to earth subsidence, frost heaving and other causes of unwanted pipeline movement which have not been satisfied by existing types of pipeline monitoring methods and apparatus. It is to this end that the present invention has been developed with a view to providing an improved method and system for monitoring pipeline displacement or changes in curvature.

SUMMARY OF THE INVENTION

The present invention provides an improved method and system for determining the course of a subterranean or submarine pipeline for monitoring any displacement of the pipeline as a result of subsidence, frost heaving and other natural or man induced events which have caused the pipeline displacement and which might unduly stress or rupture the line.

In accordance with one aspect of the present invention, a method for measuring displacement or change in course of a pipeline by measuring the curvature of a pipeline section in question is obtained by propelling an instrumented pipeline pig through the section of line to be measured and recording signals generated by one or more accelerometers mounted in the pig. At the time of installation of the pipeline the course or route of the pipeline may be measured by recording the signals generated upon traversing the pipeline with the instrumented pig. Subsequent trips with the pig over the same section of pipeline will provide signals indicating any change in course or trajectory by comparing the recorded signals. In particular, an arrangement of instrumentation, including at least two accelerometers arranged orthogonally with respect to the longitudinal axis of the pipeline and the pig and centered on said longitudinal axis, is provided to simplify the measuring apparatus and eliminate errors induced by gimballed platform mounted and gyroscope stabilized type systems.

In accordance with another aspect of the present invention, a pipeline monitoring system is provided for measuring curvature of a section of pipeline at a predetermined distance from a known reference point along the course of the pipeline, which curvature is obtained by propelling a pipeline pig through the section of pipeline in question and measuring displacement of the pig from a predetermined course or trajectory by two or more accelerometers mounted along the central longitudinal axis of the pipeline and the pig and by providing means for measuring the distance traveled from the pig launching point. In this way, the location of any displacement or change in curvature of the line from a previous known course may be readily obtained upon retrieval of the pig and interpretation of data recorded by the pig.

In accordance with another important aspect of the invention, there is provided a fluid transmission pipeline monitoring system comprising an instrumented pipeline pig which may be propelled through the pipeline from a launching point to a retrieving point and which is free to rotate in the pipeline about its own central axis. The pig includes instrumentation for measuring lateral curvature of the pipeline utilizing two orthogonally arranged accelerometers which are disposed along the longitudinal axis of the pig, and thus the pipeline itself, so that rotation of the pig or the accelerometers in the pipeline with respect to the pipeline longitudinal axis will not effect readings of the accelerometers and only lateral displacement of the pig while being propelled along a longitudinal course will be recorded. The instrumented pig also preferably includes means for measuring displacement of the pig from its launching point, such means comprising a magnetometer which is adapted to read magnetic anomalies provided by, for example, spaced apart welds which join respective pipeline sections together. Since the length of the respective pipe sections making up a pipeline and the locations of the respective welds may be known from predetermined pipeline data, a recorded count of the number of welds passed by the instrumented pig will locate the point of displacement of the line as measured by the accelerometers.

Those skilled in the art will recognize the above-mentioned features and advantages of the present invention together with other superior aspects thereof, upon reading the detailed description which follows in conjunction with the drawing.

BRIEF DESCRIPTION OF THE DRAWING

FIG. 1 is a perspective view, in somewhat schematic form, of a section of fluid transmission pipeline which may be monitored in accordance with the present invention;

FIG. 3 is a section view taken generally along line 3—3 in FIG. 2;

FIG. 5 is a schematic diagram of the major components of the pipeline curvature or displacement measuring system of the present invention.

DESCRIPTION OF THE PREFERRED EMBODIMENTS

Figure 2:
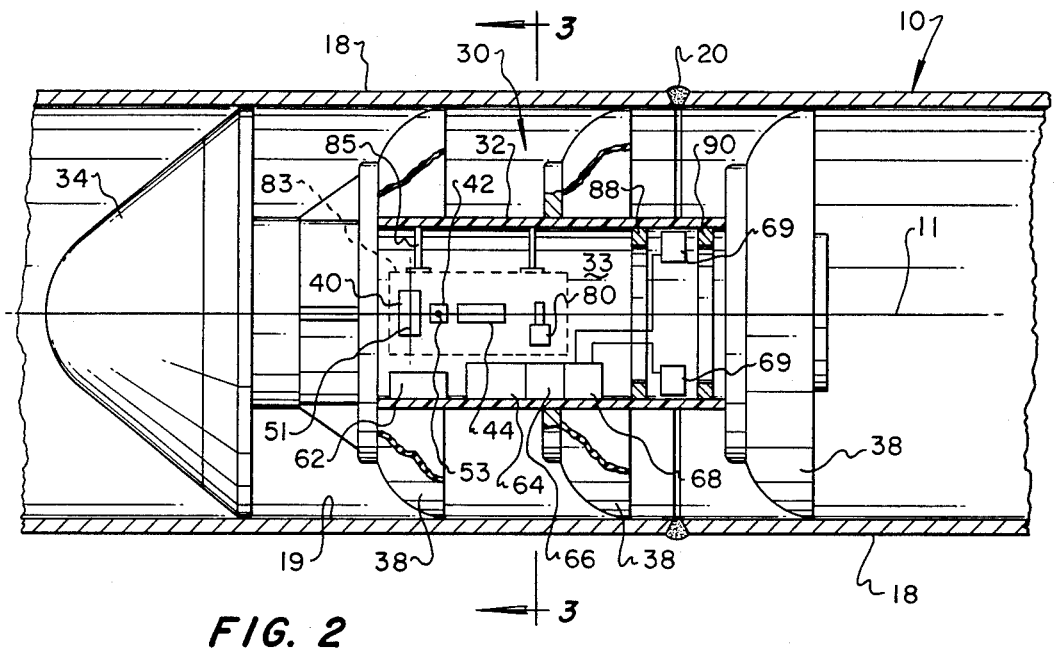
FIG. 2 is a side elevation, partially sectioned, of an instrumented pipeline pig in accordance with the present invention and shown disposed in the section of pipeline illustrated in FIG. 1.

In the description which follows, like components are marked throughout the specification and drawing with the same reference numerals, respectively. At least some of the drawing figures are in generally schematic form in the interest of clarity and conciseness.

Referring to FIG. 1, there is illustrated a section of fluid transmission pipeline, generally designated by the numeral 10. The pipeline 10 is of a type which may extend for a least part of its length under the earth's surface 12 between a first pump station 14 and second pump station 16. The pipeline secton 10 may, for example, comprise part of the Trans-Alaska Pipeline System which along its buried or subterranean portions is subject to stresses and possible unwanted displacement by the cyclical freezing and thawing of portions of the earth strata 15 in which at least a portion of the pipeline section 10 is buried.

The pipeline section 10 is made up of elongated cylindrical steel pipe sections 18, which are of known length and are welded together to form a continuous pipeline by spaced apart circumferential or girth welds 20. The pipe sections 18 could also be joined by other elements such as flanges or coupling members which would create magnetic anomalies with respect to the earth's magnetic field. The number of pipe sections 18 and welds 20 and their location can, of course, be predetermined and mapped with respect to known reference points on the earth's surface 12. Accordingly, any deviation from the known location of particular portions of the pipeline section 10 can be measured with respect to relatively fixed points on the earth's surface. However, the buried portion of the pipeline section 10 cannot be easily observed or measured with respect to localized changes in curvature or displacement as a result of shifting of portions of the earth's strata due to many factors, including the previously mentioned freezing and thawing processes.

The pipeline section 10 is provided with suitable means for launching and retrieving pipeline pigs. The pump station 14 is provided with a pig launching portion 24 and the pump station 16 is provided with a suitable pig retrieving section or trap 26. Accordingly, a pipeline pig may be launched at the launching portion or launcher 24 and traverse the length of the pipeline section 10 to be retrieved at the retrieving section 26. A unique pipeline pig in accordance with the present invention may be propelled by fluid through the pipeline section 10 from the launcher 24 to the retrieving section 26 and data retrieved from a storage or recording device on the pig may then be analysed to determine the actual course of the pipeline, including any displacements or change in curvature from a predetermined known position of the pipeline section 10.

Referring also to FIGS. 2 and 3, an improved pipeline pig in accordance with this invention is illustrated and generally designated by the numeral 30. In FIG. 2, the pipeline pig 30 is shown disposed in a portion of the pipeline section 10 and moving past one of the welds 20 interconnecting the respective known lengths of pipe 18. The pig 30 includes a generally cylindrical housing 32, which is preferably fabricated of high strength, lightweight material such as a reinforced plastic. The housing 32 is adapted to support an impact nose or cushion structure 34 to minimize impact forces imposed on the pig 30 as it terminates its trip and moves into the retrieving section 26. The pig 30 is also preferably supported in the pipeline 10 by a plurality of generally annular resilient cushion and support cups 38. The cups 38 are preferably made of a relatively stiff but elastic material and preferably extend radially outward into essentially fluid tight engagement with the interior wall surface 19 of the pipe sections 18. Accordingly, fluid pumped into the pipeline behind the pig 30 will act against the cups 38 to propel the pig through the pipeline section 10 at a relatively constant speed proportional to the rate of pumping of fluid. The weight of the housing 32 is minimized and the stiffness of the material from which the cups 38 are made is predetermined to be such as provide for natural and rigid body vibration frequencies of the pig structure which are substantially greater than the frequencies of the signals indicating a change in curvature of the course of the pipeline section 10 which are the signals of interest. This construction of the pig 30 also tends to minimize yawing or pitching movements of the housing 32 as it travels along the pipeline section 10 so that the pig 30 remains generally centered along a central axis 11 of the pipeline section and with its own central axis coaxial with the axis 11. The housing 32 is closed at both ends by suitable closure members, not shown, one of which may be removable for access to an interior space 33.

In accordance with the present invention, it is contemplated that a pipeline curvature or displacement measuring instrument system may be provided in the space 33, including at least two orthogonally oriented accelerometers 40 and 42. In the arrangement illustrated in FIGS. 2, 3 and 4, a third accelerometer 44 is also disposed in the space 33 and suitably mounted, along with the accelerometers 40 and 42, in a fixed position with respect to the housing 32.

Figure 4:
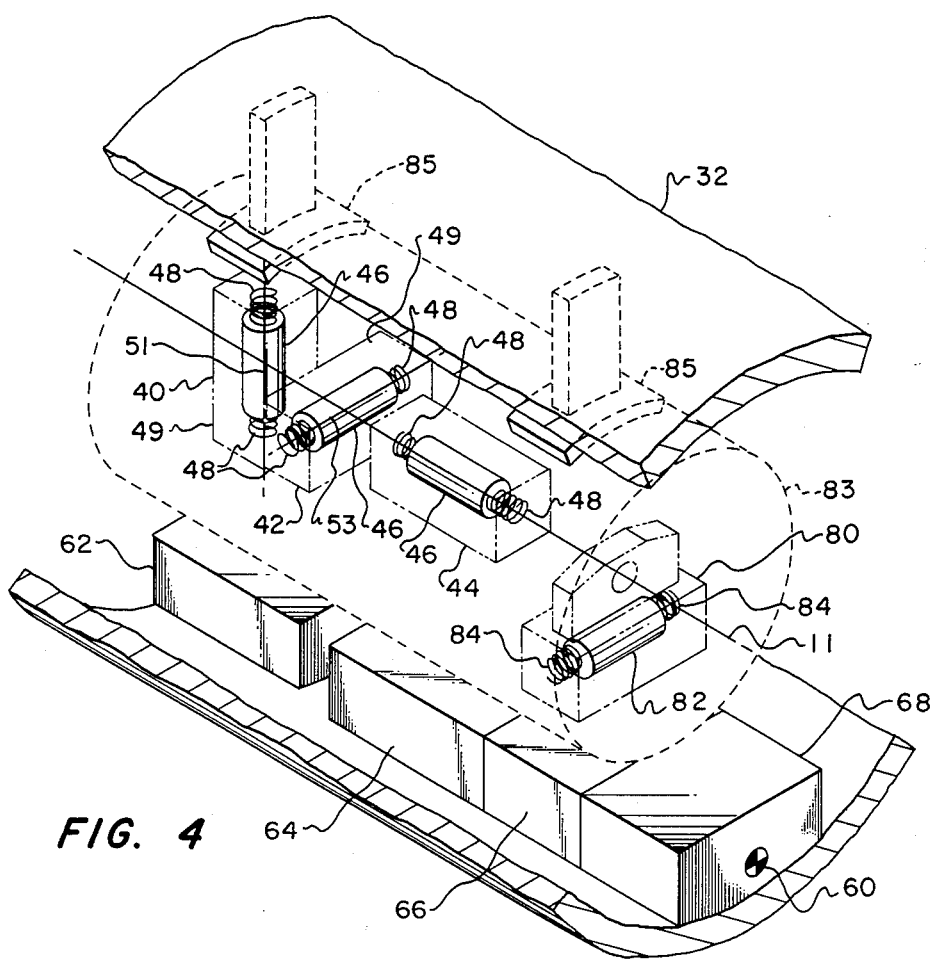
FIG. 4 is a schematic diagram showing the location of accelerometers used in the system of the present invention with respect to the longitudinal axis of the pig illustrated in FIG. 2.

Referring briefly to FIG. 4, there is illustrated a somewhat schematic configuration of the accelerometers 40, 42 and 44. The accelerometers 40, 42 and 44 are exemplary and may be of a type wherein each accelerometer is provided with a mass 46 supported by and between opposed springs 48 to assume an equilibrium position coaxial with the axis 11. The masses 46 are each suitably adapted to provide an output signal if they are displaced relative to respective support housings 49.

For example, each of the accelerometer masses 46 might be connected to a potentiometer contact whose zero position corresponds to the neutral or equilibrium position of the mass. Acceleration having a component along any one of the axes 51, 53 or 11 will act on the masses of the respective accelerometers 40, 42 and 44 resulting in displacement, which can be measured and integrated to provide a recorded signal of displacement of the pig 30, and thus the pipeline section 10 from a predetermined course or trajectory. The axes 51, 53 and 11 are mutually perpendicular. The curvature of any portion of the pipeline section 10 may, in fact, be measured by measuring the accelerations along the axes 51 and 53 and computing the curvature according to the following equation:

$$K = a_n/v^2$$

wherein: k=the pipe's curvature, a=the acceleration normal to the pipe longitudinal axis and v=the velocity of the pig with respect to the pipe longitudinal axis. Longitudinal velocity and displacement of the pig 30 can be measured by the accelerometer 44 or by recording the number of welds 20 passed per unit time as measured by a suitable magnetometer onboard the pig 30 which, as a weld 20 is passed by the pig, may sense the magnetic anomaly caused by the weld. In any case, by locating at least two accelerometers, such as the accelerometers 40 and 42, for movement along mutually perpendicular axes normal to the axis 11 and located, in their equilibrium positions, along the axis 11 of the pipeline section 10, displacement or change in curvature of the pipeline from a predetermined course may be measured. The specific configuration or type of accelerometer used in the system of the present invention may be different from the type described herein. Servo accelerometers, variable inductance and piezoelectric types can be used. An important consideration is that seismic mass of the accelerometer be positioned such that error signals are not generated due to rolling of the pig about its central axis.

The location of the accelerometers 40 and 42 along the axis 11, which is coincident with the axis of the pig 30, provides for output signals from the accelerometers which may be converted to pipeline curvature values regardless of the roll position or attitude of the pig 30 with respect to the axis 11. Although a resultant curvature value may be determined from signals generated by the accelerometers 40 and 42, the actual direction of curvature or displacement of the pipe central axis from a previous course or trajectory is not necessary since only a change in curvature or displacement is being sensed with respect to a predetermined course or position of the pipeline section 10. However, in order to minimize the tendency for the pig 30 to roll about its longitudinal central axis as it traverses the pipeline section 10, it is highly advantageous to place the center of gravity of the pig 30 in a position which will bias the pig to maintain a predetermined roll attitude.

Referring to FIG. 3, it is indicated that the center of gravity of the pig 30 is located at point 60 for example, which is displaced from the axis 11. This center of gravity 60 may be provided by adding weights 62, FIG. 2, placed within the interior of the housing 32 in such a way that the pig 30 is biased to assume the attitude shown in the drawing figures. In this regard also, all electronic components disposed within the housing 32 are displaced against a sidewall of the housing adjacent to the weights 62 to assist in placing the center of gravity 60 displaced from the axis 11 as shown. For example, the pig 30 includes an instrument enclosure 64, a source of electrical energy such as a battery 66 and a magnetometer, generally designated by the numeral 68, all of which are located against the interior sidewall of the housing 32 in the position illustrated in FIGS. 2, 3 and 4.

The enclosure 64 preferably includes, as shown by the schematic diagram of FIG. 5, an analog filter 70 operably connected to an analog to digital signal converter 72 and a suitable recording device 74. The accelerometers 40, 42 and 44 are adapted to provide output signals to the analog filter 70 whereby extraneous signals caused by high frequency vibration and minor yawing and pitching movements of the pig are filtered out of a signal which is delivered from the filter 70 to the analog to digital converter device 72. In this way, only displacements of the pig 30 representing significant lateral displacements of the pipeline section 10 are recorded by the recording device 74. As shown in FIGS. 2, 4 and 5, the actual roll angle of the pig 30 may also be determined by including a clinometer 80 constructed somewhat like one of the accelerometers and having a mass 82 disposed in an equilibrium position by opposed springs 84 when the central longitudinal axis of the masses 46, of the respective accelerometers 40 and 42 are in a predetermined position such as vertical and horizontal, respectively. An output signal from the clinometer 80 may be recorded on the recording device 74 also. In this way, the roll attitude to the pig 30 may be compared with the resultant curvature or displacement signal generated by the accelerometers 40 and 42 to determine the actual direction of displacement or curvature of the pipeline section with respect to the earth. As shown in FIG. 2, the magnetometer 68 includes one or more sensors 69 disposed within the housing 32 in such a way that, as the pig 30 passes a girth weld 20, a change in the intensity of a magnetic field, established by magnetic pole pieces 88 and 90, FIG. 2, can be measured to provide an output signal from the magnetometer 68 to the recording device 74 to form a count of the number of welds passed by the pig from its launching point. Alternatively, the pipeline section 10 may be provided with marker magnets, not shown, spaced apart on the pipeline at predetermined locations. Since the locations of the respective girth welds 20 are known and the number of welds may be counted as the pig 30 progresses through the pipeline section 10, the location of a change in curvature of the pipeline may be determined within a distance no less than the length of one of the pipe sections 18.

Accordingly, by providing the pig 30 having an arrangement of direction or curvature sensing elements such as the magnetometers 40 and 42 located at the central longitudinal axis of the pig, which axis is generally coincident with the central longitudinal axis 11 of the pipeline section 10, the pig 30 may be traversed through the pipeline and output signals from the accelerometers recorded on a suitable recording medium such as a magnetic tape associated with the recording device 74. The accelerometers 40, 42 and 44 and the clinometer 80 are all preferably disposed in a housing 83 suitably supported by support members 85 in the housing 32.

The specific configuration of the pig 30 may be modified in several ways in accordance with otherwise conventional pipeline pig construction. For example, the cups 38 may be replaced by one or more arrangements of support structure comprising support rollers or wheels engageable with the inner wall surface 19 of the pipeline and which are supported on spring biased lever arms secured to the housing 32. The springs are preloaded sufficiently to bias the rollers against the pipe wall so as to minimize bouncing or vibration of the pig as it traverses the pipeline. As discussed previously, the total weight of the pig should be kept at a minimum and the damping springs as stiff as possible so as to provide that any natural modes of vibration of the pig will be at frequencies greater than the signals of interest recorded as the pig traverses the pipeline.

The accelerometers 40, 42 and 44, the clinometer 80, and the signal conversion and recording devices such as the filter 70, converter 72 and recording device 74 may be of types commercially available and adapted for use according to the method and apparatus of the present invention by those of ordinary skill in the art of the invention. Accordingly, a detailed description of specific configurations of these elements is not believed to be necessary to enable one to practice the invention. Although preferred embodiments of the invention have been described herein in detail various substitutions and modifications may be made to the specific embodiments disclosed without departing from the scope and spirit of the invention as recited in the appended claims.

What I claim is:

1. A methof of determining a change in curvature of a section of subterranean or submarine pipeline comprising the steps of:
providing pipeline pig means having onboard displacement sensing means mounted on said pig means in such a way that accelerations of said pig means due to changes in direction of the longitudinal axis of said section of pipeline may be sensed as said pig means traverses said section of pipeline without maintaining the roll attitude of said displacement sensing means in a predetermined position, said displacement sensing means comprising first and second accelerometer means mounted coaxial with the longitudinal central axis of said pig means and mounted for measuring accelerations normal to said longitudinal central axis and along axes forming an angle with each other, said pig means including position sensing means for determining the position of said pig means along the longitudinal axis of said section of pipeline and means for measuring the longitudinal velocity of said pig means along said longitudinal axis of said section of pipeline, said pig means including means operable for recording output signals from said displacement sensing means, said velocity sensing means and said position sensing means, and said pig means including support means for supporting said pig means to have its longitudinal central axis substantially coincident with the said longitudinal axis of said section of pipeline;
launching said pig means into said section of pipeline at a predetermined point on said section of pipeline and propelling said pig means through said section of pipeline while producing signals commensurate with the longitudinal velocity and position of said pig means in said section of pipeline and while producing signals indicative of lateral accelerations of said pig means due to curvature and/or change of longitudinal direction of said section of pipeline; and
retrieving said pig means at a retrieving station of said pipeline.

2. The method set forth in claim 1 including the step of:
providing recording means on said pig means for recording signals related to said accelerations and the position of said pig means in said section of pipeline; and
recovering said recording means at said retrieving station so that recorded signals may be interpreted to determine displacement of said section of pipeline from a predetermined course.

3. The method set forth in claim 1, including the step of:
supporting said pig means in said section of pipeline during its traversal therethrough without restraining said pig means from rolling about its own longitudinal axis in said section of pipeline;
and recording the angle of inclination of said pig means from a predetermined roll attitude of said means.

4. The method set forth in claim 1 wherein:
the step of determining the position of said pig means includes providing means for measuring a change in the intensity of a magnetic field caused by girth welds between specific pipe sections of said section of pipeline to determine the location of said pig means at which changes in direction of said section of pipeline occur.

5. The method set forth in claim 1 wherein:
said step of producing signals indicative of lateral accelerations of said pig means comprises producing a resultant acceleration signal and integrating said resultant acceleration signal to provide a resultant displacement signal.

6. The method set forth in claim 1, including the step of:
providing means for determining the roll attitude of said pig means during traversal through said section of pipeline, and recording said roll attitude while recording any output signal generated by said displacement sensing means.

7. A method for determining a change in curvature of a section of generally cylindrical fluid transmission pipeline, said section of pipeline including a plurality of end-to-end connected pipe sections defining said section of pipeline and having a central longitudinal axis, said method comprising the steps of:
providing a pipeline pig having means for supporting itself in said section of pipeline, said pig including accelerometer means mounted for sensing accelerations along axes substantially normal to said central longitudinal axis, said accelerometer means being mounted with respect to said central longitudinal axis such that signals produced by said accelerometer means are substantially insensitive to the roll attitude of said pig during traversal through said section of pipeline, and said means supporting said pig providing for natural modes of vibration of said pig as it traverses said section of pipeline to be of a frequency substantially greater than the signal frequency indicating a change in curvature of said section of pipeline;
providing means for sensing the position of said pig with respect to a predetermined point on said section of pipeline when traversing said section of pipeline;

launching said pig at a first predetermined point on said pipeline and recording signals generated by said position sensing means and said accelerometer means during traversal of said pig through said section of pipeline to determine a change in curvature or displacement of said section of pipeline; and retrieving said pig at a second predetermined point on said pipeline.

8. Apparatus for determining a change in curvature of a section of generally cylindrical fluid transmission pipeline having a central longitudinal axis, said apparatus comprising:

a pipeline pig including a housing and means for supporting said housing in said section of pipeline, said pig including accelerometer means mounted in said housing for sensing accelerations along axes substantially normal to said longitudinal axis and means for generating signals indicating the longitudinal velocity of said pig along said section of pipeline; and said means for supporting said housing comprising a plurality of spaced apart resilient support members having a stiffness such that the natural modes of vibration of said pig laterally with respect to said longitudinal axis, as said pig traverses said section of pipeline, are of a frequency substantially greater than the measured signal frequencies of a said accelerometer means and said means for indicating velocity to indicate a change in curvature of said section of pipeline.

9. Apparatus for measuring the curvature or displacement of at least a section of fluid transmission pipeline, said section of pipeline comprising a plurality of end-to-end connected generally cylindrical pipe sections, said apparatus comprising:

a pipeline pig including a housing having an interior space, means for supporting said housing in said section of pipeline for traversal therethrough in a predetermined position with respect to the longitudinal axis of said section of pipeline and means for propelling said pig through said section of pipeline;

displacement sensing means mounted within said housing and with respect to said longitudinal axis of said section of pipeline and nonresponsive to the roll attitude of said pig during traversal through said section of pipeline for generating a signal indicating a change in curvature of said section of pipeline, said displacement sensing means comprising at least two accelerometers mounted for sensing accelerations along respective axes forming an angle with each other, said axes being substantially normal to the longitudinal axis of said section of pipeline, said accelerometers being mounted substantially coaxial with respect to said longitudinal axis of said section of pipeline;

means for measuring the velocity of said pig along said longitudinal axis of said section of pipeline;

means for determining the longitudinal position of said pig in said section of pipeline; and means for recording signals generated by said displacement sensing means, said velocity measuring means and said means for determining the longitudinal position of said pig, whereby the location of and degree of change in curvature or displacement of said section of pipeline may be determined.

10. The apparatus set forth in claim 9 wherein:

the axis of movement of one of said accelerometers is normal to the axis of movement of the other of said accelerometers.

11. The apparatus set forth in claim 9 including:

clinometer means disposed in said housing for measuring the roll attitude of said pig during its traversal through said section of pipeline.

12. The apparatus set forth in claim 9 wherein:

said position sensing means includes means for sensing a magnetic anomaly as said pig passes from one pipe section to another pipe section during its traversal through said section of pipeline.

13. The apparatus set forth in claim 9 including:

means for positioning the center of gravity of said pig displaced from the longitudinal central axis of said section of pipeline when said pig is disposed therein for biasing said pig in a predetermined roll attitude during traversal of said pig through said section of pipeline.

14. The apparatus set forth in claim 13, including:

means associated with said displacement sensing means for filtering out signals created by relatively high frequency vibrations of said pig with respect to said section of pipeline, and means for recording signals generated by said displacement means indicative of displacement of said section of pipeline from a predetermined attitude.

* * * * *